(12) United States Patent
Isik et al.

(10) Patent No.: US 7,326,750 B1
(45) Date of Patent: Feb. 5, 2008

(54) EXPANDED NANOCLAYS AND METHOD OF PRODUCING SUCH EXPANDED NANOCLAYS

(76) Inventors: Kivanc Isik, Kurtulus 2014, Sok.Ulker Apt. No:1/9, Aydin (TR) 09020; Gokhan Andi, 1722 Cambridge Rd., Ann Arbor, MI (US) 48104

( * ) Notice: Subject to any disclaimer, the term of this patent is extended or adjusted under 35 U.S.C. 154(b) by 0 days.

(21) Appl. No.: 11/548,748

(22) Filed: Oct. 12, 2006

(51) Int. Cl.
*C08J 3/34* (2006.01)
*B32B 5/16* (2006.01)
*C09K 3/00* (2006.01)

(52) U.S. Cl. .................... 524/445; 524/446; 428/328; 516/101

(58) Field of Classification Search ............ 106/287.17
See application file for complete search history.

(56) References Cited

U.S. PATENT DOCUMENTS

| | | | |
|---|---|---|---|
| 5,760,121 A | 6/1998 | Beall et al. | |
| 5,844,032 A * | 12/1998 | Serrano et al. | 524/445 |
| 6,242,500 B1 * | 6/2001 | Lan et al. | 516/101 |
| 2001/0025076 A1 * | 9/2001 | Lan et al. | 524/445 |
| 2002/0022678 A1 * | 2/2002 | Lan et al. | 523/202 |
| 2002/0058740 A1 * | 5/2002 | Lorah et al. | 524/445 |
| 2004/0183051 A1 * | 9/2004 | Wenzel et al. | 252/378 R |
| 2004/0241427 A1 * | 12/2004 | Zhu et al. | 428/328 |

FOREIGN PATENT DOCUMENTS

WO  2004/063264 A1  7/2004

OTHER PUBLICATIONS

[Abstract Only]—Sidheswaran et al.; "Intercalation of Salts of Fatty Acids into Kaolinite" Clays and Clay Minerals; vol. 38 (1); Feb. 1990; pp. 29-32.

[Abstract Only]—Grigor'eva et al.; "Mechanochemical Synthesis of Dispersed Composites with Layer Structure from Kaolinite and Some Organic and Inorganic Acids:IR Study" Inorganic Materials; vol. 32 (2); 1996; pp. 194-199.

Chou et al.; "Unusual Intercalation of Cationic Smectite Clays with Detergent-Ranged Carboxylic Ions" Macromolecular Rapid Communications; vol. 26 (23); Dec. 2, 2005; pp. 1841-1845.

* cited by examiner

*Primary Examiner*—Jerry A. Lorengo
*Assistant Examiner*—Shuangyi Abu-Ali
(74) *Attorney, Agent, or Firm*—IP Authority, LLC; Ramraj Soundararajan

(57) ABSTRACT

A method of producing nanoclays comprising the steps of preparing a first intercalant alkali salt of a carboxylic acid, adding the first intercalant to a swelled clay at a temperature of at least 50° C. so that the metal ions on the clay surface forms a complex with the carboxyl group that enlarges the space between the two galleries of clay. The method further comprises the step of adding an organic acid as a second intercalant to the clay modified by the first intercalant to form a clay/organic salt/organic acid complex. The clay/organic salt/organic acid complex may be post processed by precipitating, homogenizing with a solution comprising of water and alcohol, filtering, drying, milling, and sieving to produce the desired nanoclay.

28 Claims, 7 Drawing Sheets

EXPANDED NANOCLAYS AND METHOD OF PRODUCING SUCH EXPANDED NANOCLAYS

BACKGROUND OF THE INVENTION

1. Field of Invention

The present invention relates generally to nanoclays. More specifically, the present invention relates to a method of producing expanded clays using carboxylic acid salts and soluble organic acids.

2. Discussion of Prior Art

Nanocomposites are a new class of composite materials that contain nano-level inorganic particulates such as silica (as described in the paper to Motomatsu, et al. titled "Microstructure of acrylic polymer-silica nanocomposite surface by scanning force microscopy") and clay (as described in the paper to Kawasumi, et al. titled "Preparation and mechanical properties of Polypropylene-clay hybrids") in polymer structures. The first clay/polymer nanocomposites based on Nylon-6 (as described in the publication to Okada, et al. titled "Synthesis and properties of nylon 6/clay hybrids, Polymer based molecular composites") were produced on 1989 in Toyota research laboratories of Japan.

Manufacturers have filled polymers with particles in order to improve the stiffness and toughness of materials, to enhance their barrier properties and their resistance to fire and ignition. Addition of particulate fillers sometimes imparts drawbacks to the resulting composites such as brittleness or opacity. An interesting aspect of the use of nanofillers is the very low amount of filler that has to be added to the polymer in order to be effective. In this way, the undesired effects due to the introduction of the traditional amounts of inorganic additives, which are very high, can be avoided. The improvements in thermal, mechanical, optical, permeability and flammability properties of polymer/clay nanocomposites are significantly higher than those achieved in traditional filled polymers.

A member of layered silicate clays commonly used in the production nanoclays is montmorillonite (MMT). These clays have layered lattice structures in which the tactoids (crystallites) consist of stacked two dimensional oxyanions separated by layers of hydrated cations. The oxygen atoms define layers containing two sheets of tetrahedral sites and a central sheet of octahedral sites. The 2:1 relation between the tetrahedral and the octahedral sheets in a layer defines 2:1 layered silicates. FIG. 1 shows a typical 2:1 layered silicate the layer is made up of a central octahedral sheet, usually occupied by aluminum or magnesium, sandwiched to between two sheets of tetrahedral silicon sites. These layers organize themselves to form the stacks with a regular gap between them, called interlayer or gallery. The metallic cations hold these stacks together also giving the natural hydrophilic character to the structure. Montmorillonite can expand 10 times of its original volume because of this hydrophilic behavior.

MMT is naturally a hydrophilic material, which makes it difficult to exfoliate in a polymer matrix. Therefore, surface treatment of silicate layers is necessary to render its surface more hydrophobic, which facilitates exfoliation. Generally, this can be done by ion-exchange reactions between the cationic onium ions in the form of ammonium or phosphonium functional group ($R_4N^+X^-$ or $R_4P^+X^-$) and the $Na^+$ cations in the clay structure. The ion exchange and intercalation alkyl chain in the interlayer expands the basal spacing between the silicate layers.

Conventional intercalating agents like 12-aminolauric acid, hexadecylamine, fatty amine, bis (2-hydroxy ethyl) methyl tallow alkyl amine and stearyl amine have low molecular weights and can be converted to the corresponding ammonium salts such as quaternary ammonium chloride or bromide salts. Through ionic exchange reactions, the counter ions in the interlayers of the clay can be ionically exchanged and the basal spacing is extended to an amount between 13.2 and 22.7° A.

U.S. Pat. No. 6,414,069 to Pinnavaia uses an intercalating agent $CH_3(CH_2)_nNH_3^+$ in the exchange reaction with metal ion salts in the layered structure of montmorillonite clay (MMT) and organically modified MMT is then dispersed in diglycidyl ether of bisphenol-A to form epoxy/layered clay nanocomposite. By using such intercalating agents, the basal spacing of MMT is increased to 18° A. The mixture of MMT with epoxy resin forces the polymeric molecules into the clay layers and a nanocomposite structure is formed after curing at 75° C. The interlayer distance (basal spacing) of clay is between 13-18° A, which allows the epoxy to polymerize within and further exfoliate the layered structure of the clay.

Japanese Patent No. 8-22946 (Toyota Company) discloses commercial inorganic/organic polymer composite material in nanoscale dispersion. The composite material is synthesized by dispersing $[H_3N^{30}(CH_2)_{11}COO^-]$-montmorillonite in Nylon-6, in which amino carboxylic acid is provided as an intercalating agent and the polymers are formed between the layers of the amino acid intercalated clay by condensing caprolactam monomers to Nylon-6 polymer. The amino carboxylic acid intercalating agent renders the modified clay compatible for Nylon-6. However, these modified montmorillonite is unsuitable for nonpolar polymers such as polyethylene and polypropylene.

Japanese Patent Publication No. 8-53572 provides other organic onium ions as intercalating agents to mix with layered silicate that can easily disperse in polyolefin resin. However, the organic onium ions can only enlarge the interlayer distances to an amount between 13.2 and 22.7° A and the interaction between the intercalating agent and the polyolefin is too weak to exfoliate the layered structure.

The paper published by Chou, et al. (Macromolecular Rapid Communications, vol. 26 (23); 2005; pp.1841-1845) discloses a method for intercalation of divalent smectite clays with alkali salts of alkyl carboxylic acids resulting in clays with basal spacing of 43° A. This paper provides a method to produce expanded clay in the absence quaternary ammonium salts.

The prior art fails to teach a method to produce expanded clays by using water soluble acids containing carboxyl groups without the use of hazardous chemicals such as quaternary ammonium salts as ionic exchanging agents. Additionally, the prior art fails to teach a two step intercalation process to produce expanded clays using an alkali salt of a fatty acid as the first intercalant and a soluble organic acid as the second intercalant.

Whatever the precise merits, features, and advantages of the above-cited references, none of them achieve or fulfills the purposes of the present invention.

SUMMARY OF THE INVENTION

The present invention, in one embodiment, teaches the production of nanoclays that are highly dispersible in polymers and have an interlayer distance of at least 30° A.

The present invention, in another embodiment, teaches a method to produce a clay/organic salt/organic acid complex.

In this embodiment, layered clay is hydrated with water to prepare swelled clay. The swelled clay is mixed with an alkali salt of a fatty acid and heated to a temperature of at least 50° C., to prepare a clay/organic salt complex. A soluble polar organic acid is added to the clay/organic salt complex at a temperature of at least 50° C., to prepare the clay/organic salt/organic acid complex wherein the soluble polar organic acid is hydrogen bonded to the clay/organic salt complex.

Another embodiment of the present invention teaches a method to produce nanoclay comprising the steps of: (a) preparing a first intercalant, (b) swelling clay with water, (c) adding the first intercalant with the swelled clay at a temperature of at least 50° C., preferably from 50-80° C., (d) adding a second intercalant to the mixture of (c) to prepare a final mixture, and (e) precipitating the intercalated clay from the final mixture.

In an extended embodiment, after the addition of the second intercalant to the mixture, the layered silicate completely precipitates after 6 hours at the temperature between 50-60° C. and pH in the range of 1.8-3.4.

In another extended embodiment the precipitate of layered silicate is further homogenized with water and alcohol solution. In an extended embodiment the homogenate is further filtered, dried, milled, and sieved to desired nanoclay.

In another extended embodiment, the first intercalant is prepared by heating a mixture comprising of fatty acid and alkali base in an aqueous medium at a temperature of at least 50° C., preferably from 50-80° C.

In another embodiment the fatty acid and alkali base are added at a molar ratio of 1:1. The alkali base can be selected from but not limited to the group consisting of lithium hydroxide, sodium hydroxide, potassium hydroxide, rubidium hydroxide, cesium hydroxide, and francium hydroxide. In one embodiment, the fatty acid has a molecular weight ranging from 200 g/mol to 340 g/mol. The fatty acid can be selected from but not limited to the group consisting butyric acid, lauric acid, myristic acid, palmitic acid, stearic acid, arachidic acid, oleic acid, linoleic acid, alpha-linolenic acid, docosahexaenoic acid, eicosapentaenoic acid, arachidonic acid, erucic acid.

In one embodiment, the second intercalant with long carbon chain is used to further modify expanded layered clays to increase the compatibility with organic polymers. In another embodiment, the second intercalant is selected from a group of water soluble organic acids having polar carboxylic groups. Polyacrylic acid (PAA) is a suitable organic acid for second intercalation reaction, because it is water soluble and it contains polar carboxylic groups. In another embodiment, the second intercalant has the molecular weight ranging from 87 g/mol to 230,000 g/mol. The second intercalant can be selected from but not limited to the group consisting polyethylene oxide, polypropylene oxide, their amine derivatives polyethyleneoxide-amine, polypropylene oxide-amine, polyacrylic acid, polyvinyl alcohol, polyvinyl alcohol-amine, polyacrylamide, poly-N-vinyl pyrrolidone, polymethacrylic acid or a combination thereof.

In another embodiment, the second intercalating agent is added to the solution of swelled intercalated clay to increase the amount of intercalation of the organic molecules through the silicate galleries. In another embodiment, the second intercalant is added at a pH in the range of 1.8-3.4. In another embodiment the second intercalant is added at the same temperature and pH of step (c).

In another embodiment, the clay used in the present invention is layered clay. The layered clay can be selected from but not limited to the group consisting montmorillonite, sepiolite, vermiculite, kaolin, mica, and talc. Generally, the clay used in the present invention has a cation exchange capacity (CEC) ranging between 40-200 meq/100 g.

In another embodiment, the molar ratio of said first intercalant to cationic exchange capacity of said layered clay is n:(n+1), where n is any number from 1 to 6. In another embodiment, the weight ratio of said second intercalant to the layered clay is k:(k+1), wherein k is any number from 1 to 7.

The alcohol used in the homogenizing step can be selected from but not limited to the group consisting of a group consisting of methyl, ethyl, propyl, butyl alcohol, and combination thereof. In another embodiment, the alcohol to water weight ratio in homogenizing step is m:(1−m), where m is any number from 0.2 to 0.6. In another embodiment, the homogenizing step is performed at a temperature in the range of 20-50° C.

In another embodiment, the drying step is carried out at a temperature of at least 80° C. In another embodiment, the milling of dried nanoclay is carried out at range of 50-150 rpm. In another embodiment, the sieving of milled nanoclay is carried out at range of 75 μm-105 μm mesh.

In another embodiment, the nanoclay of the present comprises of a structure fonnula I:

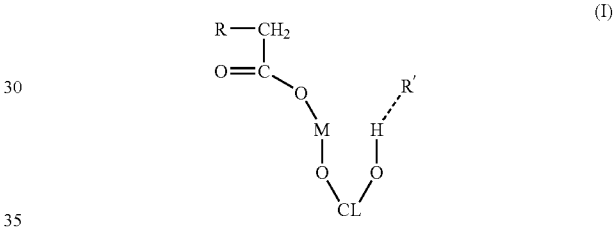

wherein:

M is a divalent metal selected from a group consisting of $Mg^{2+}$, $Ca^{2+}$;

R' is an organic acid selected from a group consisting of Polyacrylic acid. Poly(acrylamide) acid, Carboxylic pyrrolidonic acid, Poly(methacrylic) acid;

CL is a layered clay selected from a group consisting of montmorillonite, sepiolite, kaolin, vermiculite, and mica;

R is a long chain alkyl; and

R' is hydrogen bonded with free hydroxyl groups of the layered clay.

DESCRIPTION OF THE PREFERRED EMBODIMENTS

Figure 1:
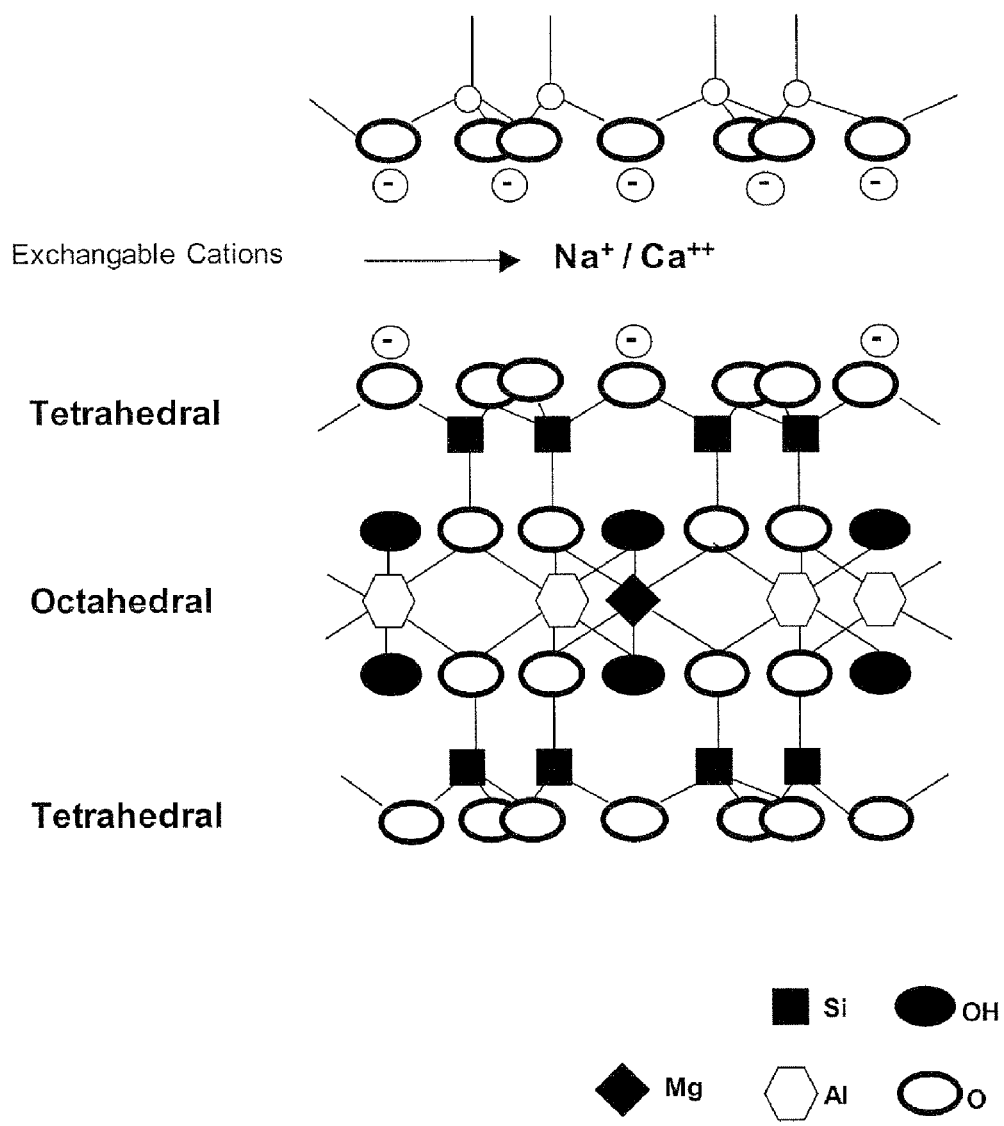
FIG. 1 illustrates Phyllosilicate structure of montmorillonite used according to one embodiment of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The process of production of nanoclays described hereinafter is not limited to MMT and the process maybe applied to any other layered clay such as montmorillonite, sepiolite, kaolin, vermiculite, mica, or a combination thereof.

Figure 2:
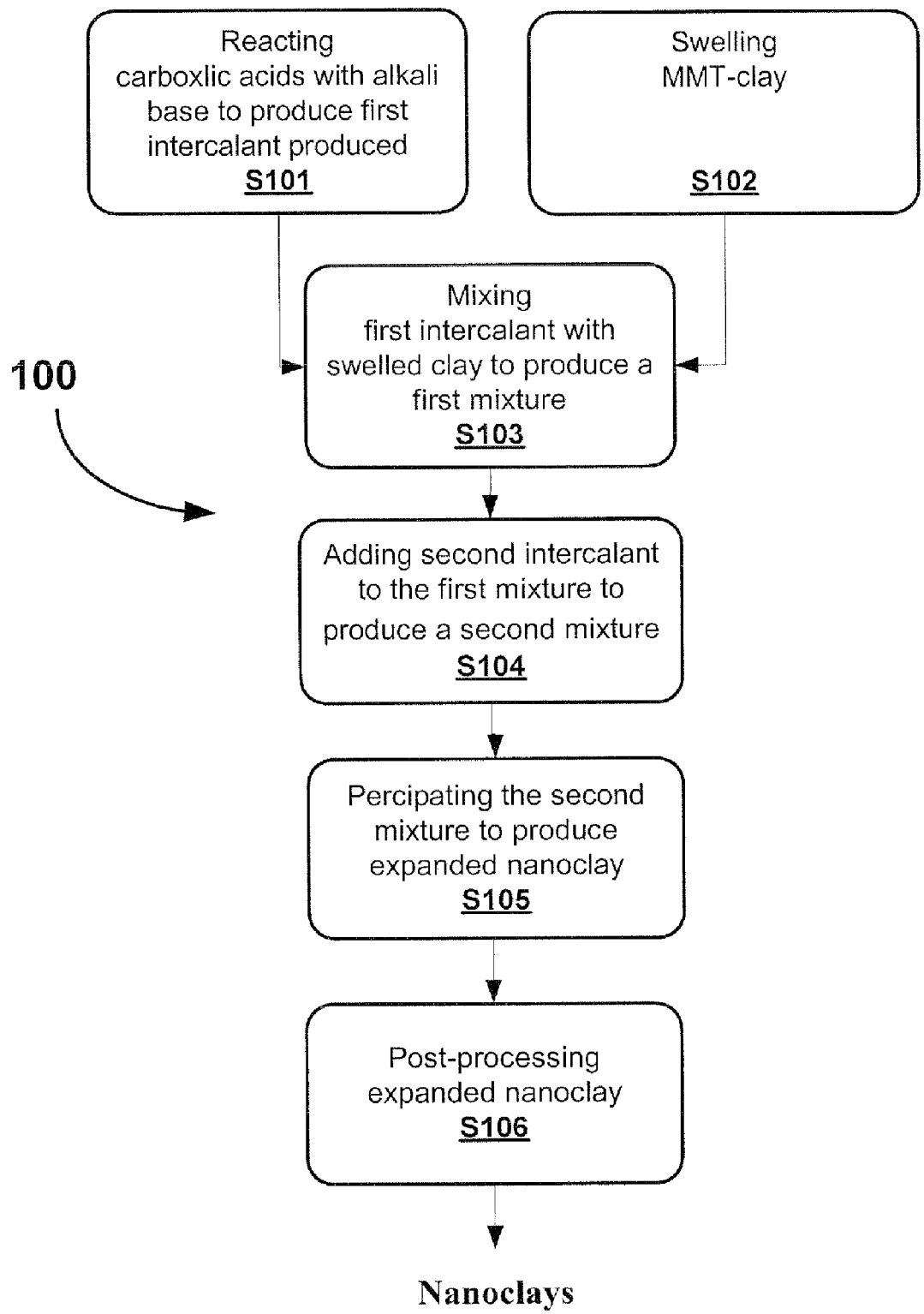
FIG. 2 illustrates a flowchart for nanoclay production process according to an exemplary embodiment of the present invention.

FIG. 2 illustrates process 100 to produce expanded nanoclays according to an exemplary embodiment of the present invention. Layered clay is swelled with water to produce hydrated layered clay in step S102. Salts of carboxylic acids may be prepared through a process of heating a mixture comprising of carboxylic acid and alkali base in an aqueous medium at a temperature of at least 50° C. in step S101. The alkali base used may be, but not limited to lithium hydroxide, sodium hydroxide, potassium hydroxide, rubidium hydroxide, cesium hydroxide, or francium hydroxide. The carboxylic acid may be a fatty acid with a molecular weight ranging from 200 g/mol to 340 g/mol. The fatty acid may be, but not limited to butyric acid, lauric acid, myristic acid, palmitic acid, stearic acid, arachidic acid, oleic acid, linoleic acid, alpha-linolenic acid, docosahexacnoic acid, cicosapentaenoic acid, arachidonic acid, erucic acid. The process of intercalating of salts of carboxylic acids produced by step S101 in hydrated clay produced in step S102 yields the production of clay/organic salt complex in step S103.

Figure 3:
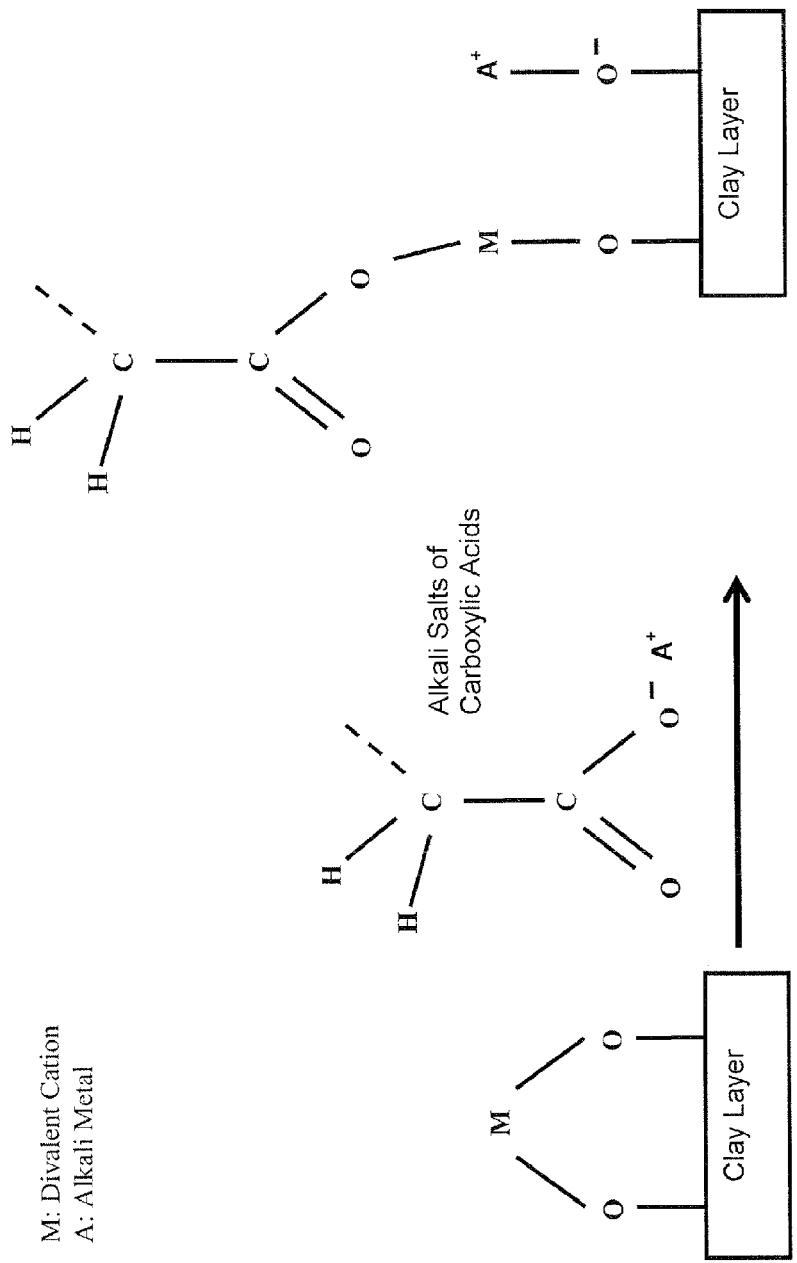
FIG. 3 illustrates the mechanism of modification of nanoclays with the first intercalant, intercalation with alkali salts of carboxylic acids according to an exemplary embodiment of the present invention.

The reaction mechanism to produce clay/organic salt complex is illustrated in FIG. 3. The divalent ion on the clay surface forms a complex with the carboxyl group that enlarges the space between the two galleries of natural montmorillonite. The alkali metal that has one valent electron bonds to the oxygen atom on the clay layer. Since the distance between the clay layers are increased after this modification, the penetration of organic acids with high molecular weight is promoted for further intercalation.

Figure 4:
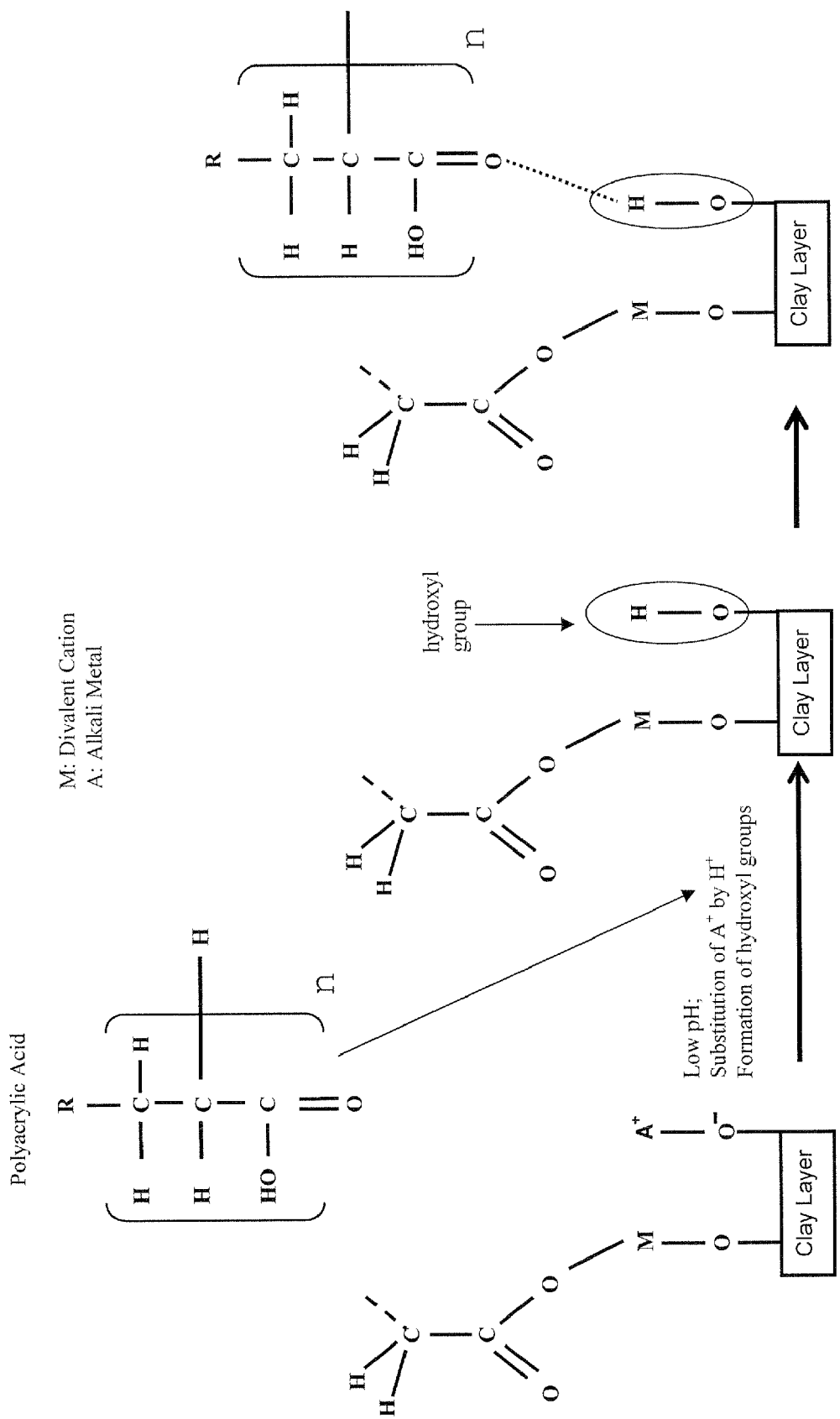
FIG. 4 illustrates the mechanism of modification of nanoclays with the second intercalant, intercalation with soluble organic acids according to an exemplary embodiment of the present invention.

The process of intercalating soluble organic acids (second intercalant) in clay/organic salt complex produced in step S103 yields the production of clay/organic salt/organic acid complex in step S104. Soluble organic acids used as second intercalants may be, but not limited to polyacrylic acids (PAA). The acidic character of PAA lowers the pH of the fatty acid salt/layered clay complex solution. At this low pH condition, exchange of alkali metals (generally, $Na^+$ or $K^+$) by $H^+$ occurs and hydroxyl groups on the clay surfaces are formed. FIG. 4 illustrates the reaction mechanism of intercalation of soluble organic acid to clay/organic salt complex. The penetration of long carbon chained PPA is promoted by the formation of hydrogen bonds between the hydroxyl group on the clay surface and carboxyl group in the structure of PPA.

Expanded nanoclays are precipitated from the clay/organic salt/organic acid complex solution produced by step S104. Post processing of the precipitate clay/organic salt/organic acid complex produced in step S105 may be necessary to produce desired expanded nanoclays. Post processing steps, represented by step S106, of the present invention may include, but not limited to further homogenization, filtration, drying, milling, sieving, and a combination thereof. The precipitate produced in step S105 is homogenized with an alcohol and water solution. The alcohol to water weight ratio homogenizing solution may be m:(1−m), where m is any number from 0.2 to 0.6. The alcohol may be an aliphatic alcohol such as methanol, ethanol, propanol, butanol, or combination thereof. Homogenizing may be performed at a temperature in the range of 20-50° C. The filtrate of homogenate may be dried at a temperature of at least 80° C. Milling of dried filtrate is carried out at range of 50-150 rpm. The nonoclay may be obtained after sieving of milled nanoclay. The sieving is carried out at range of 75 µm-105 µm mesh.

Unlike conventional modification, the present invention includes no hazardous chemicals to be used and to be released as waste products during the process. Less water consumption is another advantage indicating the environmental sensitivity of nanoclay production by this method. The developed chemical process allows producing nanoclays with increased layer distances that are more organic and compatible with plastic materials than the present nanoclays. The thermal stability of the organic molecules in the nanoclay structure will promote the usage of this unique filler at elevated temperatures and in high-temperature melting plastics.

The present invention includes a chemical modification process of clays that comprises two intercalation reactions; first with the alkali salts of carboxylic acids and second with the intercalation of high molecular weight organic acids. The enlargement of clay galleries is improved by using water soluble acids containing carboxyl groups. Use of alkali salts of fatty acid increases volume between the silicate layers for the organic acid penetration. The use of alkali salts of fatty acid as the first intercalant promotes the intercalation of long organic molecules by modifying the silicate surfaces for hydrogen bonding between the hydroxyl groups on the surface and carboxyl group in the organic acid structure.

This invention provides nanoclays with high quality basal spacing and hydrophobic behavior. These nanoclays may be used in high temperature applications

EXAMPLE 1

Fatty acid is mixed with Potassium hydroxide (KOH) in the molar ratio of 1:1. The mixture is heated to temperatures of at least 50° C. to facilitate the formation of fatty acid salt, which is the first intercalant to be used for producing nanoclay. Montmorillonite (MMT) is hydrated with water. The series of reactions in this first step is summarized in below:

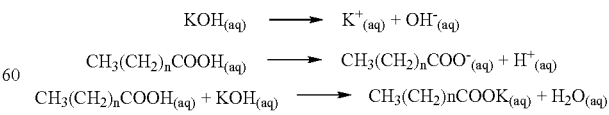

These salts are mixed with swelled montmorillonite (MMT) at a molar ratio of the salt n:(n+1), wherein n is moles of salt and (n+1) is molar cation exchange capacity (CEC) of the clay. The reaction is held out under 50-80° C.

and pH~1.8-3.4. The reaction is continued for 5 hours to increase the interaction between the organic molecules and layered silicate.

Figure 5:
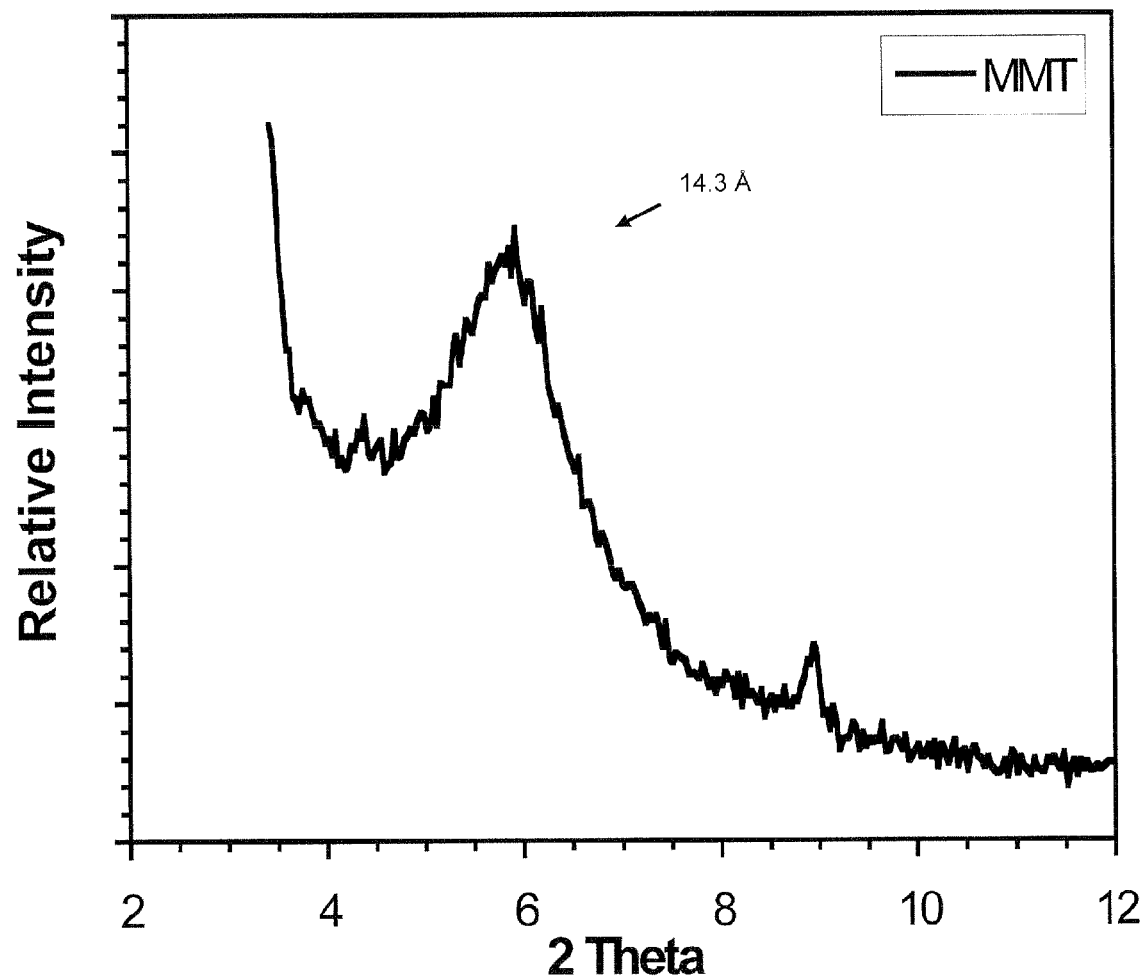
FIG. 5 illustrates the X.RD pattern of natural montmorillonite.
Figure 6:
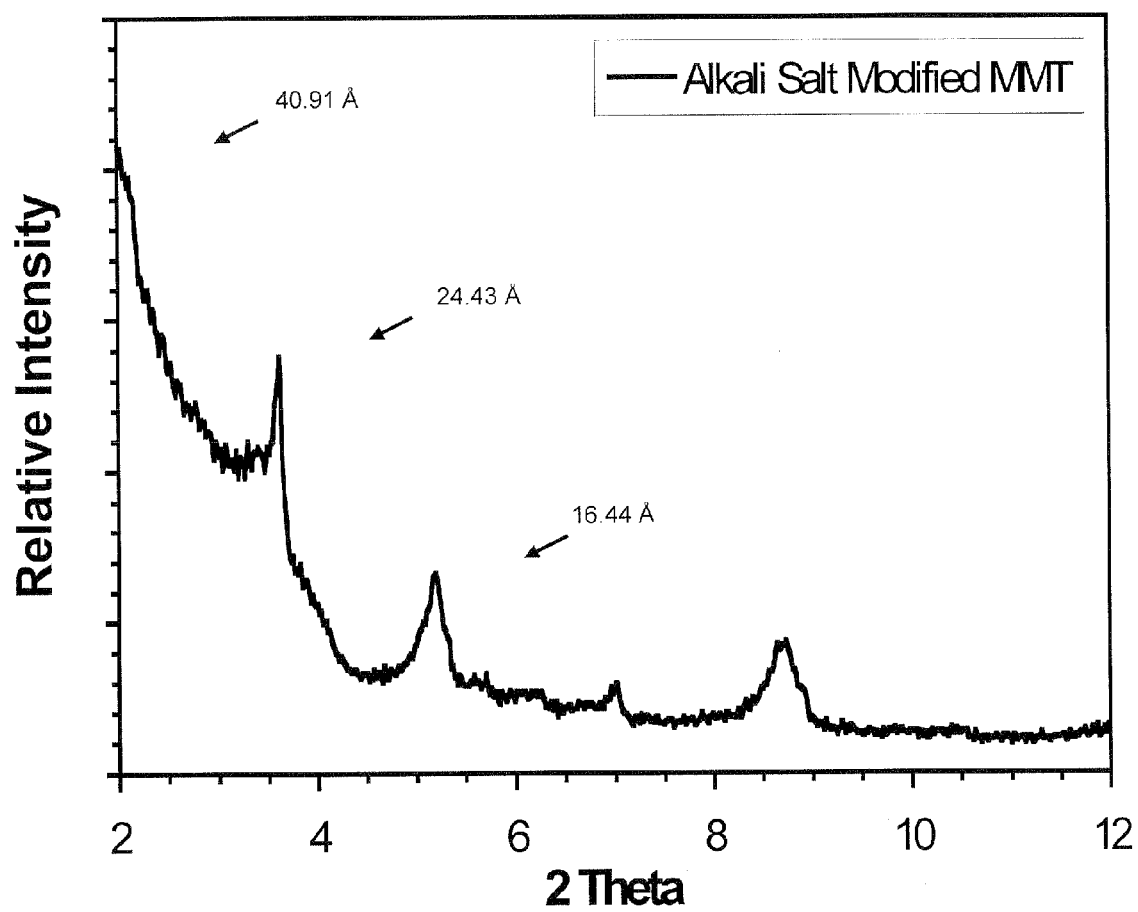
FIG. 6 illustrates the XRD pattern of natural montmorillonite intercalated with alkali salts of carboxylic acids according to an exemplary embodiment of the present invention.

The microstructure X-ray diffraction characterization is implied to obtain the information about the basal spacing of the nanoclay that is produced by this method. The XRD pattern ol the produced nanoclay after the modification process with an alkali salt of carboxylic acid is shown in FIG. 6. Successfully most of the crystallographic planes have the basal distance of 40.91° A with diffraction angle of 2.16°. The other characteristic peaks of 24.43° A and 16.44° A having the diffraction angles 3.61° and 5.37°. The XRD characterization of MMT shows an interlayer distance is 14.3° A (see FIG. 5).

EXAMPLE 2

Further modification to increase the basal spacing between tie clay layers obtained in Example 1 is done by using water soluble organic acid. Polyacrylic acid (PAA) is one of the most suitable organic acids for second intercalation reaction, because it is water soluble and it contains polar carboxylic groups. It is added to the solution of carboxylic salt/MMT complex with a weight ratio of MMT to polyacrylic acid, k:(k+1), where k varies from 1 to 7, under pH conditions 1.8-3.4.

Figure 7:
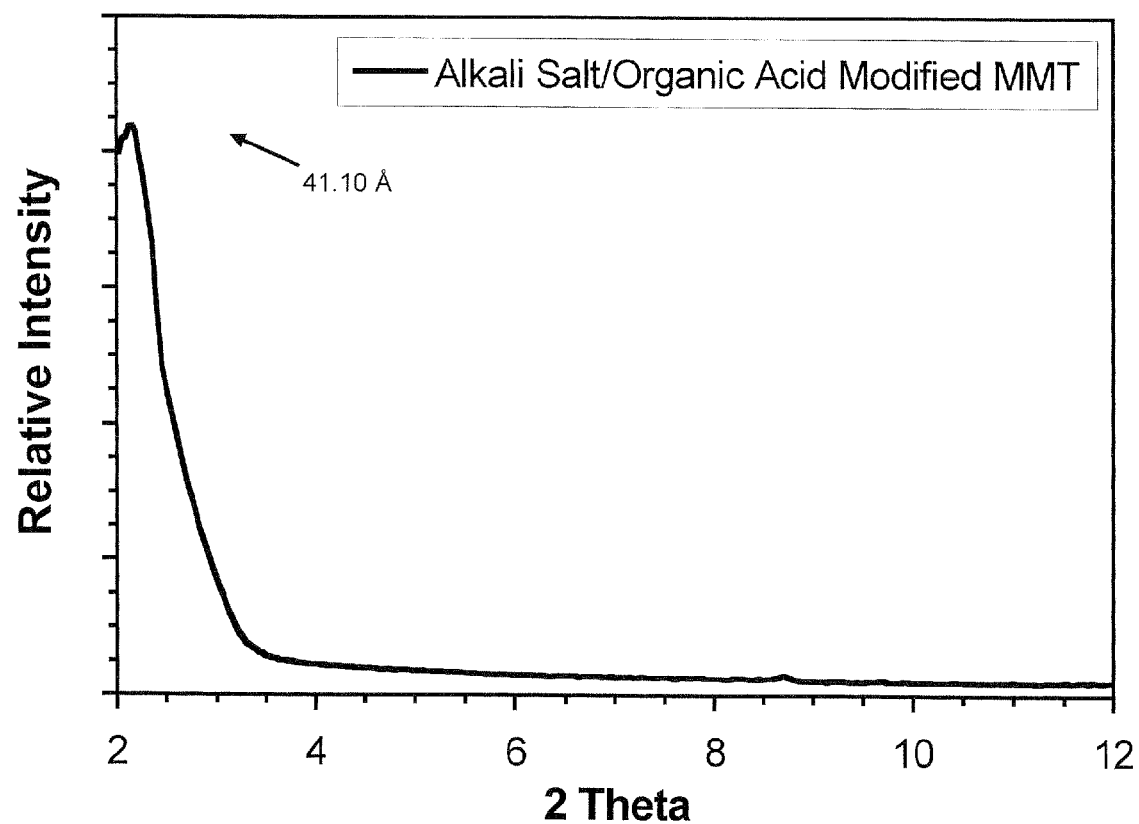
FIG. 7 illustrates the XRD pattern of modified montmorillonite intercalated with soluble organic acids according to an exemplary embodiment of the present invention.

The polyacrylic acid finds enough free space to intercalate into the clay galleries that was previously increased by carboxylic salt intercalant. The acidic media promotes the formation of hydrogen bonds between the silicate layers and water soluble polyacrylic acid. The XRD pattern of polyacrylic acid modified nanoclay is shown in FIG. 7. Further intercalation increases the number of silicate layers with the d-spacing around 40° A and the minor peaks of 3.61° and 5.37° become invisible in the pattern. Addition to this the basal spacing is increased from 40.91° A to 41.10° A.

CONCLUSION

The present invention provides for an expanded nanoclay and method for intercalating natural layered clay using two intercalants without using the conventional ion exchange step. This invention has the advantages that the consumption of water and production of hazardous chemicals is reduced. By eliminating the ion exchange reactions, no hazardous waste is added to the environment in the process of nanoclay production. This invention provides a more economic way of nanoclay production.

A method has been shown in the above embodiments for the effective production of expanded clays. While various embodiments have been shown and described, it will be understood that there is no intent to limit the invention by such disclosure, but rather, it is intended to cover all modifications failing within the spirit and scope of the invention, as defined in the appended claims.

The invention claimed is:

1. A method to produce an expanded nanoclay comprising the steps of:
   (a) preparing a first intercalant, said first intercalant comprising an alkali salt of a fatty acid;
   (b) swelling a clay with water to prepare a swelled clay;
   (c) mixing said first intercalant with said swelled clay at a temperature of at least 50° C.;
   (d) adding a second intercalant to said mixture of step (c) to prepare a second mixture; and
   (e) precipitating said nanoclay from said second mixture, and
   (f) homogenizing said precipitate of nanoclay with a solution comprising of water and alcohol, wherein alcohol to water weight ratio is m:(1−m), where m is any number from 0.2 to 0.6.

2. A method of producing an expanded nanoclay as in claim 1, wherein said method further comprises a post processing step, said post processing step comprising:
   (g) filtering said nanoclay from said homogenized solution of (f);
   (h) drying said filtered nanoclay of (g);
   (i) milling of said dried nanoclay of (h); and
   (j) sieving of said milled nanoclay of (i).

3. A method of producing an expanded nanoclay as in claim 1, wherein said first intercalant alkali salt is prepared by heating a mixture comprising of fatty acid and alkali base in an aqueous medium at a temperature of at least 50° C.

4. A method of producing an expanded nanoclay as in claim 1, wherein said second intercalant is added at the same temperature and pH of said mixture of (c).

5. A method of producing an expanded nanoclay as in claim 4, said second intercalant is added at a pH in the range of 1.8-3.4.

6. A method of producing an expanded nanoclay as in claim 1, wherein said second intercalant is selected from a group of organic acids having polar carboxylic groups.

7. A method of producing an expanded nanoclay as in claim 1, wherein said fatty acid has a molecular weight ranging from 200 g/mol to 340 g/mol.

8. A method of producing an expanded nanoclay as in claim 3, wherein said alkali base is selected from the group consisting of lithium hydroxide, sodium hydroxide, potassium hydroxide, rubidium hydroxide, cesium hydroxide, and francium hydroxide.

9. A method of producing an expanded nanoclay as in claim 3, wherein said fatty acid and alkali base are added at a molar ratio of 1:1.

10. A method of producing an expanded nanoclay as in claim 1, wherein said fatty acid is selected from the group consisting of butyric acid, lauric acid, myristic acid, palmitic acid, stearic acid, arachidic acid, oleic acid, linoleic acid, alpha-linolenic acid, docosahexaenoic acid, eicosapentaenoic acid, arachidonic acid, and erucic acid.

11. A method of producing an expanded nanoclay as in claim 1, wherein said clay of (b) is a layered clay selected from a group of montmorillonite, sepiolite, kaolin, vermiculite, and mica.

12. A method of producing an expanded nanoclay as in claim 10, wherein the molar ratio of said first intercalant to cationic exchange capacity of said layered clay is n:(n+1), where n is any number from 1 to 6.

13. A method of producing an expanded nanoclay as in claim 10, wherein said second intercalant has the molecular weight ranging from 87 g/mol to 230,000 g/mol.

14. A method of producing an expanded nanoclay as in claim 10, wherein the weight ratio of said second intercalant to said layered clay is k:(k+1), wherein k is any number from 1 to 7.

15. A method of producing an expanded nanoclay as in claim 10, wherein said layered clay has a cation exchange capacity ranging from 40 meq/100 g to 200 meq/100 g.

16. A method of producing an expanded nanoclay as in claim 1, wherein step (c) further comprises reacting first intercalant with said swelled clay at a temperature of at least 50° C.

17. A method of producing an expanded nanoclay as in claim 2, wherein said alcohol of (f) is selected from a group consisting of methyl, ethyl, propyl, and butyl alcohol.

18. A method of producing an expanded nanoclay as in claim 2, wherein said alcohol and water of (f) are mixed at a temperature in the range of 20-50° C.

19. A method of producing an expanded nanoclay as in claim 2, wherein said drying of said filtered nanoclay of (h) is at a temperature of at least 80° C.

20. A method of producing an expanded nanoclay as in claim 2, wherein said milling of said dried nanoclay of (i) is at range of 50-150 rpm.

21. A method of producing an expanded nanoclay as in claim 2, wherein said sieving of said milled nanoclay of (j) is at range of 75 μm-105 μm mesh.

22. A method to manufacture an expanded nanoclay without performing an ion exchange reaction with an onium ion:
  (a) intercalating a swelled clay with a first intercalant comprising an alkali salt of a fatty acid, said intercalation does not include said ion exchange reaction with an onium ion;
  (b) intercalating a second intercalant to said intercalated clay of (a);
  (c) precipitating said expanded nanoclay from (b), and
  (d) homogenizing said precipitate of said expanded nanoclay with a solution comprising of water and, alcohol, wherein alcohol to water weight ratio is m:(1−m), where m is any number front 0.2 to 0.6.

23. A method to manufacture an expanded nanoclay of claim 22, wherein said first intercalant comprising an alkali salt of a fatty acid.

24. A method of producing an expanded nanoclay as in claim 23, wherein said alkali salt is selected from the group consisting of lithium hydroxide, sodium hydroxide, potassium hydroxide, rubidium hydroxide, cesium hydroxide, and francium hydroxide.

25. A method of producing an expanded nanoclay as in claim 23, wherein said fatty acid and alkali base are added at a molar ratio of 1:1.

26. A method of producing an expanded nanoclay as in claim 23, wherein said fatty acid is selected from the group consisting of butyric acid, lauric acid, myristic acid, palmitic acid, stearic acid, arachidic acid, oleic acid, linoleic acid, alpha-linolenic acid, docosahexaenoic acid, eicosapentaenoic acid, arachidonic acid, and erucic acid.

27. A method of producing an expanded nanoclay as in claim 22, wherein said second intercalant is selected from a group of organic acids having polar carboxylic groups.

28. A method to produce a clay/organic salt/organic acid complex comprising the steps of:
  (a) swelling a clay with water to prepare a swelled clay;
  (b) adding a first intercalant to said swelled clay at a temperature of at least 50° C., to prepare a clay/organic salt complex, said first intercalant comprising an alkali salt of a fatty acid;
  (c) adding a second intercalant to said clay/organic salt complex at a temperature of at least 50° C., to prepare said clay/organic salt/organic acid complex; said second intercalant comprising a soluble polar organic acid;
  (d) precipitating said clay/organic salt/organic acid complex from (c), and
  (e) homogenizing said precipitate of clay/organic salt/organic acid complex with a solution comprising of water and alcohol, wherein alcohol to water weight ratio is m:(1−m), where m is any number from 0.2 to 0.6.

* * * * *

UNITED STATES PATENT AND TRADEMARK OFFICE
CERTIFICATE OF CORRECTION

PATENT NO. : 7,326,750 B1
APPLICATION NO. : 11/548748
DATED : February 5, 2008
INVENTOR(S) : Kivanc Isik and Gokhan Andi It is certified that error appears in the above-identified patent and that said Letters Patent is hereby corrected as shown below:

Col. 1, line 51, delete "to".

Col. 4, line 24, delete "fonnula" and insert therefore --formula--.

Col. 7, line 7, delete "ol" and insert therefore --of--.

Col. 7, line 54, delete "failing" and insert therefore --falling--.

Signed and Sealed this

Tenth Day of June, 2008

JON W. DUDAS
*Director of the United States Patent and Trademark Office*